Oct. 14, 1947.  H. NINNIS ET AL  2,428,920
TORQUE METER
Filed Jan. 11, 1944
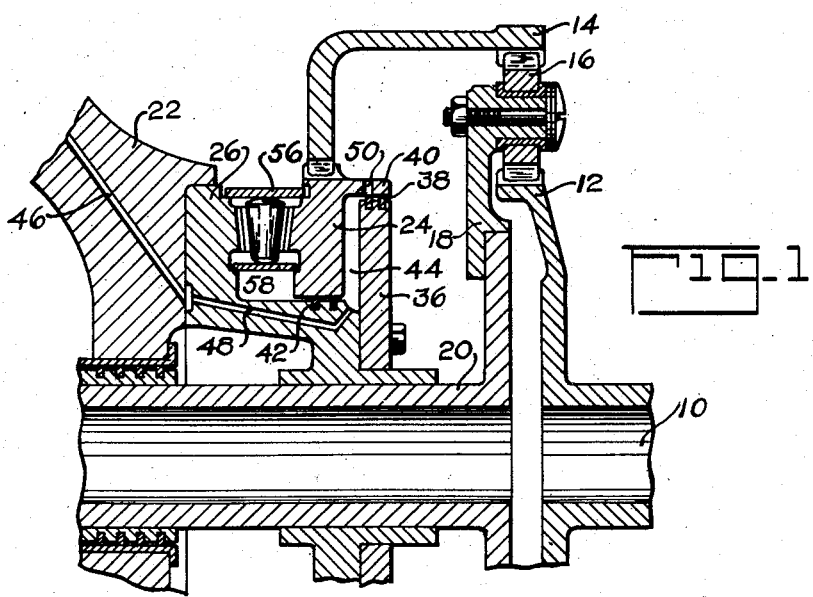
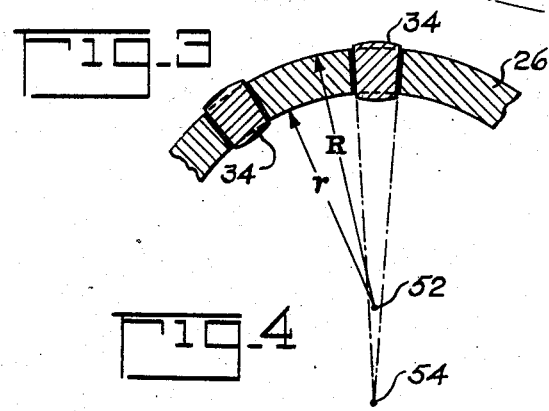
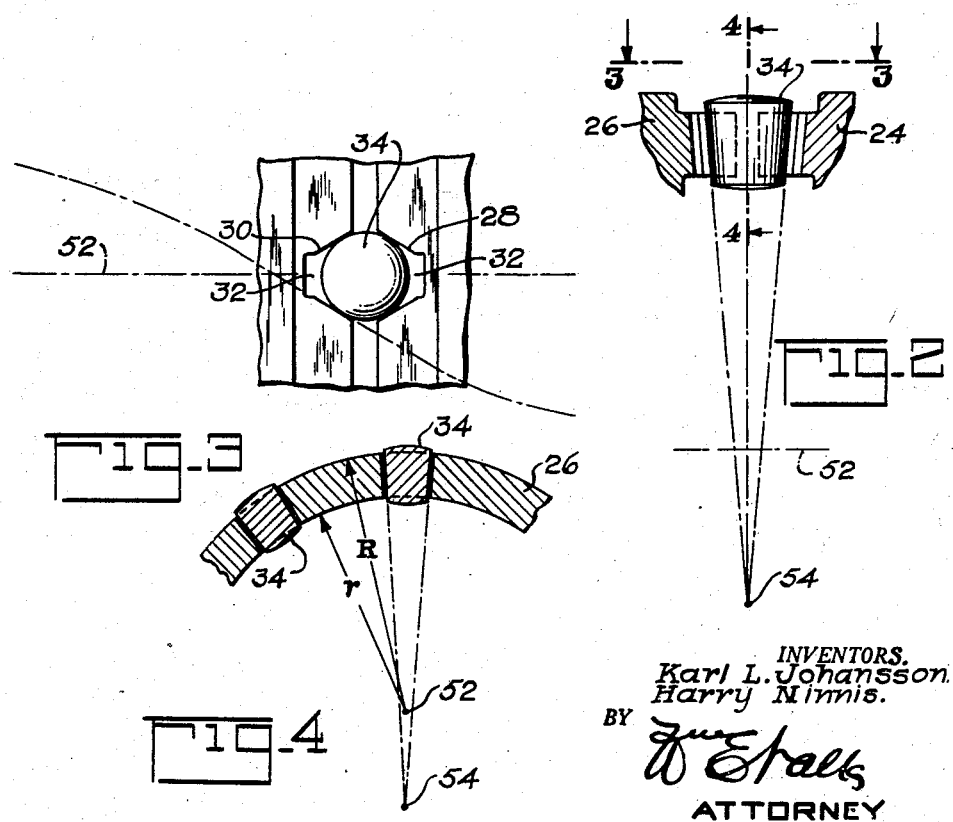
INVENTORS.
Karl L. Johansson.
Harry Ninnis.
BY
ATTORNEY Patented Oct. 14, 1947

2,428,920

UNITED STATES PATENT OFFICE 2,428,920

TORQUE METER

Harry Ninnis, Clifton, and Karl L. Johansson, Hackensack, N. J., assignors to Wright Aeronautical Corporation, a corporation of New York Application January 11, 1944, Serial No. 517,890

3 Claims. (Cl. 74—305)

This invention relates to means for continuously measuring the torque to which a given mechanism is subjected and is particularly directed to improvements in the type of torque meter illustrated in Patent No. 2,289,285 to R. Chilton.

As disclosed in the aforementioned patent, the torque meter consists of a torque-responsive reaction member for a planetary gear transmission in which the reaction member instead of being rigidly secured to the transmission housing is connected thereto through a torque-responsive means. This torque-responsive means comprises a thrust plate together with a plurality of circumferentially disposed spherical balls interposed between and disposed in conical pockets formed in the reaction member and thrust plate, whereby the reaction member torque produces an axial force on the thrust plate. Fluid pressure controlled by the relative axial movement of the reaction member and thrust plate balances this axial force, derived from the torque reaction, whereby this fluid pressure is a measure of the torque reaction. In his conventional construction the spherical balls do not travel along straight lines on the surface of their conical pockets but instead they inherently travel along a parabolic-like path because of the slight rotative movement of these balls about the axis of a transmission relative to the rotatively fixed pockets in the thrust plate or reaction member. As a result, there is a slight sliding movement of the balls along the surfaces of the pockets which is particularly objectionable because of the high stress and the small contact area between the balls and their conical pockets. It is an object of this invention to eliminate this sliding friction and to provide pure rolling contact between the reaction member and thrust plate.

Calibration of this conventional type torque meter depends on the relation between the tangential force derived from the torque and the axial force transmitted through the spherical balls to the thrust plate and, therefore, depends on the relation between the angular movement of the reaction member and the relative axial movement of the reaction member and thrust plate. Accordingly, it is desirable that the balls roll along a helical path of a constant lead in order to obtain a constant ratio between the magnitude of the angular movement of the reaction member and the magnitude of the relative axial movement of the reaction member and thrust plate. This result obviously is not obtained in the above described prior art construction comprising a plurality of circumferentially disposed spherical balls in conical pockets. Accordingly, it is a further object of this invention to provide a helical path of movement for the rollers of the torque meter.

Specifically, the invention consists in the substitution of radially disposed conical type rollers received in pockets having helical surfaces so that the relation between the angular motion of the reaction member and the relative axial motion of the reaction member and thrust plate is constant. In addition, the rollers are tapered such that the ratio of the lengths of the circumference of a roller at any two points along its length is in direct proportion to the lengths of the helical paths at these two points, thereby insuring true rolling contact between the roller and its pocket. Furthermore, since the conical rollers have a theoretical line contact with their pockets instead of only the theoretical point contact of the spherical balls, the use of rollers greatly reduces the magnitude of the contact stresses.

Other objects of this invention will become apparent upon reading the annexed detailed description in connection with the drawing in which:

Fig. 1 is an axial section through a transmission embodying the invention,

Fig. 2 is an enlarged view of a portion of Fig. 1,

Fig. 3 is a view taken along line 3—3 of Fig. 2 illustrating a development of the helix of one of the faces of the pockets for the rollers, and Fig. 4 is a view taken along line 4—4 of Fig. 2.

Referring to the drawing, an engine crankshaft 10 is provided with an annular driving gear 12 of a planetary reduction gear unit comprising an annular internal reaction gear 14 and a plurality of circumferentially spaced planet pinions 16. The planet pinions 16 are carried by a spider construction 18 on the propeller shaft 20. Instead of securing the reaction gear directly to the housing 22, there is interposed therebetween a torque-responsive mechanism comprising an annular back plate 24 splined to the reaction gear 14 and an annular thrust plate 26 rigidly secured to the engine housing 22. The thrust and back plates are each provided with a plurality of radially-extending and facing trough-shaped recesses 28 and 30, respectively, defining pockets 32 therebetween. A radially disposed roller member 34 is disposed within each of the pockets 32 and the nature of these pockets and roller members will be hereinafter described.

The thrust plate 26 is provided with an annular radial extension 36 having sealing rings 38 engaging an axial extension 40 at the outer periphery of the back plate 24. Sealing rings 42 are also provided between the thrust plate and the inner periphery of the back plate, thereby defining an annular cylindrical space 44 relative to which the back plate may move axially. When torque is transmitted through the planetary reduction gear unit to the propeller shaft 20, the reaction between the roller members 34 and the sloping sides of their pockets 32 is such as to urge the back plate 24 axially to the right as viewed in Fig. 1. This axial rightward reaction of the back plate 24 is balanced against fluid pressure admitted to the cylindrical space 44 through passages 46 and 48 in the engine casing and thrust plate, respectively. An escape port 50 is provided in the back plate axial extension 40 for the fluid in the cylindrical space 44 and the inner sealing ring 38 acts as a valve controlling the size of this port upon axial movement of the back plate.

With this arrangement, axial movement of the back plate 24 controls the size of the escape port 50, thereby regulating the magnitude of the fluid pressure in the cylindrical space 44. Accordingly, when the torque impressed on the reaction member increases, the plate 24 moves axially to the right until the fluid pressure in the cylindrical space 44 increases sufficiently to balance the rightward torque reaction on the back plate. Similarly, upon a decrease in the transmission torque, the fluid pressure in the cylindrical space 44 will then be greater than the axial torque reaction on the back plate 24, thereby moving the back plate to the left to effect a slight opening adjustment of the valve port 50 until the fluid pressure has been reduced to the point at which it just balances the reduced torque. Therefore, the magnitude of the fluid pressure in the annular space 44 is a measure of the transmitted torque. This operation is quite similar to that of the aforementioned patent to R. Chilton.

The sides of the recesses 28 and 30 for the roller members 34 are helical surfaces formed about the axis 52 of the propeller shaft 20, as illustrated by the dotted lines in Fig. 3. These surfaces may be readily formed by a milling or grinding machine geared to the lead of the desired helix with a cutter having the same shape as the roller member. In order to obtain true rolling action between the roller members and the sides of the trough-shaped recesses engaged thereby, it is necessary that the circumference of each transverse section of the roller member be in direct proportion to corresponding lengths of helical paths at these sections. These helical path lengths depend both on the radius of the helical path and the lead of the helix. For example, for 360° of helix, the length of the helix at the inner radial end of the pockets 32 is equal to $\sqrt{4\pi^2 r^2 + L^2}$, where $r$ is the radius to the inner end of the pocket and $L$ is the lead of the helix. Similarly, the length of the corresponding path at the outer edge of the pocket is $\sqrt{4\pi^2 R^2 + L^2}$ where $R$ is the radius to the outer edge of the pockets 32. Accordingly, the circumference of the roller members 34 at the inner and outer edges of the pockets must be in proportion to these helical lengths in order to insure true rolling contact between the rollers and the sides of the pockets. In this way the circumference of various transverse sections of the roller members may be readily computed in order to determine their profile.

In a particular installation, the inner radius $r$ and the outer radius $R$ of the pockets 32 may be approximately 4½" and 5" respectively, the maximum diameter of the roller members 34 may be approximately ¾", and the helical sides of the pockets may have a developed lead angle of approximately 60°. With these particular dimensions, the theoretical diameter of the mid-transverse section of the roller members is only .0002" less than that of a conical roller having the same extreme diameters. Therefore, for practical purposes, the roller member may be made conical. Also, it should be noted that the taper of this conical roller is slight and is such that the apex 54 of its conical sides is on the remote side of the propeller axis 52. The reason for this is readily apparent when it is realized that the diameter of various sections through the roller members is not in proportion to their radial distance from the axis 52, but is in proportion to corresponding lengths of the helical paths at these sections.

Concentric retaining rings 56 and 58 seat upon annular shoulders on the thrust and back plates for accurately locating the roller members 34 in a radial direction. The outer retaining ring 56 also absorbs the small radially outward pressure from the rollers due to their slight taper.

With the above construction the conical rollers are adapted to have pure rolling contact with the sides of the trough-shaped recesses 28 and 30, thereby eliminating the sliding friction present in the conventional spherical ball-type torque meter. Also, since the roller members roll along a helical path of constant lead, the relation between the tangential force derived from the transmitted torque and the axial force transmitted through the roller members against the fluid pressure is constant, thereby simplifying calibration of the torque meter.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In combination with a transmission, a pair of co-axial adjacent members supported for relative axial and rotative movement, said members having facing radially-extending trough-shaped recesses defining pockets therebetween, and a radially disposed roller in each of said pockets whereby motion of said rollers along the sides of their associated recesses enforces relative axial and rotative movement of said members, the sides of said recesses being substantially helical surfaces so shaped that the intersection of a plane perpendicular to the axis of said members with said surfaces is similar to the generatrix of said rollers, each of said rollers having a taper such that the ratio of the roller diameters at any two roller sections is substantially equal to the ratio of the lengths of corresponding portions of the two helical paths along the sides of said recesses at the respective radial distances of said two roller sections from said axis whereby each of said rollers has a substantially conical profile with the conical sides of each roller converging toward a point on the remote side of the axis of said members.

2. In combination with a transmission having a torque reaction member, a rotationally rigid member disposed adjacent to and co-axial with said reaction member, said members being mounted for relative rotational and axial movement and having facing radially-extending trough-shaped recesses defining pockets therebetween, the width of said trough-shaped recesses tapering radially inwardly, radially disposed substantially conical rollers within said pockets whereby said rollers engage the recess sides of said pockets to produce an axial force on said members proportional to the torsional force on said reaction member, fluid pressure means to resist said axial force, and a valve opening automatically adjusted by relative axial movement of said members for controlling said fluid pressure, the sides of said recesses being helical-like surfaces and each of said rollers having a conical profile such that the ratio of the roller diameters at any two transverse roller sections, engaging the helical sides of the associated pocket, is substantially proportional to the lengths of their respective helical-like paths.

3. In combination, a pair of relatively rotatable and axially-movable co-axial members subject to torque therebetween, said members having facing radially extending trough-shaped recesses defining pockets therebetween, the width of said trough-shaped recesses tapering radially inwardly, radially disposed substantially conical rollers within said pockets whereby said rollers engage the recess sides of said pockets to produce an axial force urging said members apart in proportion to the torque between said members, fluid pressure means to resist said axial force, and means automatically controlled by relative axial movement of said members for regulating the magnitude of said fluid pressure, the sides of said recesses being helical-like surfaces and each of said rollers having a conical profile such that the ratio of the roller diameters at any two transverse roller sections, engaging the helical sides of the associated pocket, is substantially proportional to the lengths of their respective helical-like paths.

HARRY NINNIS.
KARL L. JOHANSSON.

REFERENCES CITED

The following references are of record in the file of this patent:

UNITED STATES PATENTS

| Number | Name | Date |
| --- | --- | --- |
| 2,353,814 | Pew | July 18, 1944 |
| 1,702,817 | Daniels | Feb. 19, 1929 |
| 2,289,285 | Chilton | July 7, 1942 |
| 1,585,140 | Erban | May 18, 1926 |
| 2,125,998 | Erban | Aug. 9, 1938 |
| 1,737,295 | Bronander | Nov. 26, 1929 |

FOREIGN PATENTS

| Number | Country | Date |
| --- | --- | --- |
| 304,349 | Great Britain | Jan. 18, 1929 |

OTHER REFERENCES

Cams Elementary and Advanced, F. D. Furman (1st ed.), New York, John Wiley & Sons, Inc. 1921.